Dec. 23, 1969 J. BOS ET AL 3,485,958

COMPOSITE MAGNETIC RECORDING AND/OR PLAY-BACK HEAD WITH TWO SIDE ERASING HEADS HAVING ELECTRICALLY CONDUCTIVE STRIPS

Filed Sept. 12, 1967

INVENTORS
JULES BOS
JACOB KOORNEEF
GEORGE L. WALTHER
BY
Frank R. Trifari
AGENT

United States Patent Office

3,485,958

Patented Dec. 23, 1969

3,485,958

COMPOSITE MAGNETIC RECORDING AND/OR PLAY-BACK HEAD WITH TWO SIDE ERASING HEADS HAVING ELECTRICALLY CONDUCTIVE STRIPS

Jules Bos, Jacob Koorneef, and George Ludwig Walther, Emmasingel, Eindhoven, Netherlands, assignors, by mesne assignments, to U.S. Philips Corporation, New York, N.Y., a corporation of Delaware Filed Sept. 12, 1967, Ser. No. 667,190
Claims priority, application Netherlands, Sept. 15, 1966, 6613007
Int. Cl. G11b *5/00;* G01d *15/12*
U.S. Cl. 179—100.2 4 Claims

ABSTRACT OF THE DISCLOSURE

A composite magnetic head having a pair of equally effective erasing gaps arranged respectively on either side of a recording head is constructed with a central magnetizable body having a record/play-back gap, a pair of electrical conductors clamped to either side of the front face of the body, and another magnetizable body clamped to either of the conductors. The electrical conductors are each supplied with an alternating field serving as an erasing field.

The invention relates to a composite magnetic recording and/or play-back head comprising a recording/play-back head, the front face of which comprises an effective gap, and two erasing heads the effective gaps of which cover tracks which limit the track recorded or to be recorded by the recording/play-back gap.

Such composite magnetic recording and/or play-back heads are known and serve to prevent that in playing back records on a record carrier (for example, on a drum, disc or tape) interfering signals occur as a result of lateral positioning errors. These interfering signals may occur when a play-back gap is not accurately positioned on the track to be played back so that also a strip situated beside said track is played back. This strip may comprise, for example, information which in recording the track to be played back was not erased and consequently originates from a recording process which took place previously.

In order to diminish the occurrence of said interfering signals as a result of possible positioning errors of a magnetic recording and/or play-back head on a given track of a record carrier, an erasing head is arranged on either side of the recording/play-back head. These erasing heads cover tracks one of which limits the main track on the left-hand side and the other of which limits the main track on the right-hand side. During the recording process all the three heads are energized so that an erased strip is formed on either side of the recorded track. If required the erased strips may also be provided after recording. The choice of the width of the erasing tracks depends upon the accuracy with which by means of a positioning mechanism the head can be adjusted at a given track.

An obvious and commonly used construction of a composite magnetic recording and/or play-back head comprising a recording/play-back head flanked by erasing heads is that in which the effective gaps of the erasing heads extend at right angles to the direction of movement of the record carrier. Since this is also the direction in which the recording/play-back gap preferably extends, the three gaps will generally extend in parallel. This construction, however, has the drawback that a magnetic field produced in the effective gap of an erasing head influences the magnetic field in the effective gap of the recording/play-back head while in addition the erasing gaps in this position are just suitable for playing back signals recorded by the recording gap. Since the erasing heads and the recording/play-back head are separately magnetically from one another only by means of a very thin layer of a non-magnetisable cement and the magnetic fields are directed the same in both heads, such an undesired influencing is unavoidable. In addition the manufacture of erasing heads as described above presents structural difficulties. In order to minimize the loss of effective recording surface area, the erasing tracks may not be wider than is necessary in connection with the maximally possible positioning error.

An embodiment which does not exhibit the above-mentioned drawbacks is known, for example, from IBM Technical Disclosure Bulletin, volume 8, Nr.2, July 1965. The composite magnetic recording and/or play-back head described in said bulletin also comprises an erasing head on either side of the recording/play-back head but in contrast with the above-described construction the erasing gaps in said head extend parallel to the direction of movement of the record carirer and at right angles to the recording/play-back gap. The fields in the main gap and in the erasing gaps are no longer in the same direction so that the sensitivtiy of the erasing heads for recorded signals and the influencing of the recording/play-back circuit by the field of the erasing heads are at a minimum. (It is assumed in this case that the recording/play-back circuit is not magnetically saturated.) Moreover, in this latter construction robuster circuit components may be chosen for the erasing head so that the construction of such a head is facilitated.

A drawback of the last-mentioned head is that it is difficult to make the effective gaps of the erasing heads on the two sides of the recording/play-back head entirely equal. this equality of the effective gaps is necessary to use the available recording surface area optimally.

In order to avoid the drawbacks which are involved in the two above-described constructions of composite magnetic recording/play-back heads comprising a recording/play-back head flanked by erasing heads, such a head according to the invention is characterized in that on either side of the front face of the recording/play-back head non-magnetizable strips which are good electrical conductors are clamped between the sides of the recording/play-back circuit and another readily-magnetizable body.

The non-magnetizable strips which are good electrical conductors can easily be manufactured accurately in the same thickness. They are secured against the sides of the recording/play-back head, for example, by means of araldite. At the area of erasing a small block of readily-magnetizable material is secured on the side of the strip remote from the recording/play-back circuit. By conveying an alternating current or a direct current through a strip a magnetic field will be produced at the area where the strip is clamped between two readily-magnetizable parts which field may serve as an erasing field.

In addition to the advantage that it can be ensured in this manner that the erasing tracks accurately have the same width and that the sensitivity of the erasing head for recorded signals, as well as the influencing of the field in the recording/play-back gap by the erasing field is at a minimum, since the two fields do not extend in the same direction, the head according to the invention has an additional advantage: by arranging the erasing field in the manner described in the invention an annular closed magnetic circuit with the associated wire turns for the erasing heads is no longer necessary. This means that in addition to a diminishing of the structural difficulties occurring in providing such circuits also a comparatively considerably smaller space is necessary.

According to an embodiment of the invention the two strips are connected together in an electrically conductive manner. This, so to say, "series arrangement" of the two strips has the advantage that only two current supply and dissipation wires are suffcient. It is even simpler if, according to a further embodiment of the invention, the two strips form part of one bent strip.

In order that the invention may readily be carried into effect, a few embodiments thereof will now be described in greater detail, by way of example, with reference to the acompanying drawing, in which.

Figure 1:
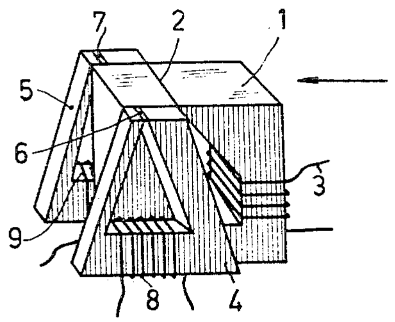
FIG. 1 PRIOR ART
FIGURE 1 is a composite magnetic recording and/or play-back head in which the erasing gaps extend at right angles to the direction of movement of the record carrier.

Reference numeral 1 denotes the recording and/or play-back head comprising an effective gap 2. The magnetic circuits of such heads, in particular when they are used for high frequencies, consist generally of ferrite, the effective gap 2 being filled with a non-magnetizable material, for example, glass. A wire winding is arranged around part of the magnetic circuit. The arrow denotes the relative direction of movement of the record carrier relative to the recording/play-back head. The width of the track recorded or played back on the record carrier by means of an effective gap 2 in some cases is 500 microns but in principle said track may have any width.

The recording/play-back head 1 is flanked by the erasing heads 4 and 5 each having an effective gap 6 and 7, respectively, and each provided with an energization coil 8 and 9, respectively, around a part of their magnetic circuits. The width of the tracks erased by the said heads and consequently of the effective gaps 6 and 7 thereof depends upon the maximum errors which may occur as a result of an inaccurate (re)positioning of the recording/play-back gap 2 on a record track. In one case this width was 100 microns. Since in this case, as shown in FIGURE 1, the erasing gaps 6 and 7 and the recording/play-back gap 2 extend in parallel, namely at right angles to the direction of movement of the record carrier, the directions of the occurring magnetic field lines in the plane of the head on which the record carrier travels extend in parallel. This parallelism combined with the fact that the various circuits are separated from one another only by means of thin cement layers is the cause that influencing of the field of the recording/play-back gap 2 by the erasing fields is unavoidable.

Figure 2:
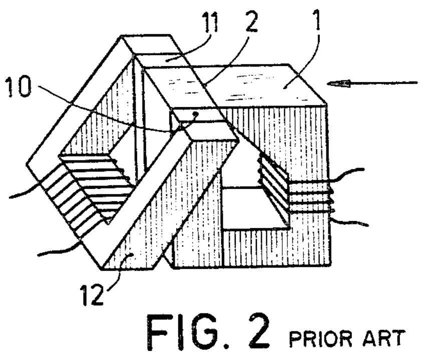
FIG. 2 PRIOR ART
FIGURE 2 shows the same type of magnetic recording and/or play-back head which comprises erasing gaps extending parallel to said direction of movement and FIGURE 3 shows a composite magnetic recording and/or play-back head according to the invention.

The composite head shown in FIGURE 2 comprises the same recording/play-back head 1 having an effective gap 2 and wire turns 3, this time, however, flanked by the erasing gaps 10 and 11 which are arranged at right angles to the recording/play-back gap 2. By arranging the erasing gaps 10 and 11 at right angles to the recording/play-back gap 2, magnetic fields of these gaps in the bearing surface of the head are also at right angles to each other; the above-mentioned influencing of the field in the recording/play-back gap 2 by the fields of the erasing gaps 10, 11 will then be at a minimum. Since the width of an erasing track and consequently the proportions of an erasing gap in the direction at right angles to the direction of movement of the record carrier relative to the head will not be chosen to be larger than is necessary in connection with the maximum occurring positioning error, it is required to choose said width of the play-back gaps to be equal for the two erasing heads in order that no recording surface area be unnecessarily lost. Since, however, the two erasing heads comprise a common U circuit component 12 it is found difficult in practice to meet this requirement. In fact, this U component 12 must be arranged in the desired position during a heating process and then be held in said position during cooling. The heating process necessary for providing the material which fill the erasing gaps 10 and 11 and also connects the U component 12 mechanically to the recording/play-back circuit.

Figure 3:
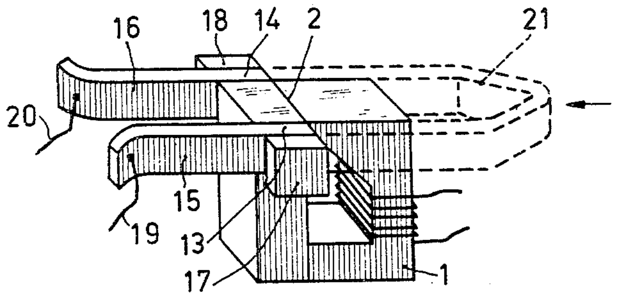

FIGURE 3 also shows a recording/play-back head 1 of the above-described type. The erasing gaps 13 and 14 are at right angles to the effective gap 2 of the recording/play-back head 1 as is the case in FIGURE 2. In this case, however, the proportions of the erasing gaps 13 and 14 in the direction at right angles to the direction of movement of the record carrier relative to the head are determined by the thickness of the two strips 15 and 16 of readily conducting non-magnetizable material. These strips 15 and 16 have accurately equal thicknesses. Since the side surfaces of the recording/play-back circuit which these strips engage are ground accurately parallel to each other erasing gaps 13 and 14 thus formed will also be accurately equal and consequently can cover tracks of exactly the same width on the record carrier. A direct current or alternating current is conveyed through the strips and produces a magnetic field around the strip. Since a block of readily magnetizable material 17 and 18, respectively, is arranged against the outside of each strip, the magnetic field produced will be concentrated at the area in which a strip is clamped between two blocks of readily magnetizable material and may serve as an erasing field.

The construction of such a head may be further simplified by electrically connecting the strips 15 and 16 together so that totally only two connections 19 and 20 are necessary for the current. The construction in which the two strips 15 and 16 form part of one bent strip is even simpler.

What is claimed is:

1. A composite magnetic head comprising a recording/play-back head having a front face with an effective gap defining a first track, and two erasing heads, each having effective gaps defining second and third tracks limiting said first track, said second and third tracks each formed by an electrically conducting nonmagnetizable strip mounted on either side of the front face of the recording/play-back head between the sides of the recording/play-back head and a readily magnetizable body.

2. A composite magnetic recording and/or play-back head as claimed in claim 1, wherein the two strips are connected together in an electrically conductive manner.

3. A composite magnetic recording and/or play-back head as claimed in claim 2, wherein the two strips form part of one bent strip.

4. A composite magnetic head comprising a recording/play-back head having a front face with an effective gap defining a first track, and two erasing heads, each having effective gaps defining second and third tracks limiting said first track, said second and third tracks each formed by an electrically conducting nonmagnetizable strip mounted on either side of the front face of the recording/play-back head between the sides of the recording/play-back head and a readily magnetizable body, and means for passing an electrical current along each of said strips.

References Cited

UNITED STATES PATENTS 2,428,449 10/1947 Camras ----------- 179—100.2

OTHER REFERENCES

Dawson, J. L.: "Side Erase Magnetic Head," IBM Technical Disclosure Bulletin, vol. 8, No. 2, July 1965, p. 220.

McClung, D. H.: "Integral Transverse Margin Erase Magnetic Recording Head," IBM Technical Disclosure Bulletin, vol. 8, No. 8, January 1966, p. 1044.

STANLEY M. GRYNOWICZ, Jr., Primary Examiner

U.S. Cl. X.R.

340—174.1; 346—74